(12) United States Patent
Jones et al.

(10) Patent No.: US 10,065,782 B1
(45) Date of Patent: Sep. 4, 2018

(54) BULK MATERIAL CONTAINER, SLEEVE AND METHOD OF ASSEMBLY

(71) Applicant: RMC Jones LLC, Prior Lake, MN (US)

(72) Inventors: Robert J. Jones, Prior Lake, MN (US); Michael R. Jones, Apple Valley, MN (US)

(73) Assignee: RMC Jones LLC, Prior Lake, MN (US)

( * ) Notice: Subject to any disclaimer, the term of this patent is extended or adjusted under 35 U.S.C. 154(b) by 0 days.

(21) Appl. No.: 15/447,475

(22) Filed: Mar. 2, 2017

(51) Int. Cl.
*B65D 3/00* (2006.01)
*B65D 5/42* (2006.01)
*B65D 77/06* (2006.01)
*B65D 5/10* (2006.01)
*B65D 5/56* (2006.01)
*B29C 65/08* (2006.01)
*B29C 65/00* (2006.01)
*B29K 23/00* (2006.01)
*B29L 31/00* (2006.01)

(52) U.S. Cl.
CPC ............ *B65D 77/062* (2013.01); *B29C 65/08* (2013.01); *B29C 66/1122* (2013.01); *B29C 66/4322* (2013.01); *B29C 66/729* (2013.01); *B65D 5/10* (2013.01); *B65D 5/4266* (2013.01); *B65D 5/563* (2013.01); *B65D 77/061* (2013.01); *B29K 2023/12* (2013.01); *B29L 2031/7126* (2013.01)

(58) Field of Classification Search
CPC ...... B65D 77/062; B65D 77/061; B65D 5/10; B65D 5/4266; B65D 5/563; B65D 5/001; B65D 5/445; B65D 5/56; B65D 5/62; B65D 88/1612; B65D 88/1618; B29C 65/08; B29C 66/1122; B29C 66/4322; B29C 66/729; B31B 1/26; B31B 1/60; B31B 7/26
USPC ... 229/108, 199, 109, 164.1, 117.28, 117.35, 229/122.32, 122.21, 122.33; 383/117; 428/36.1

See application file for complete search history.

(56) References Cited

U.S. PATENT DOCUMENTS

| | | |
|---|---|---|
| 49,390 A | 8/1865 | Doolittle |
| 915,455 A | 3/1909 | Lynch, Jr. |
| 920,637 A | 5/1909 | Paar |
| 1,044,023 A | 11/1912 | Colgate |
| 1,139,281 A | 5/1915 | Hazelton |
| 1,794,821 A | 3/1931 | Andrews |
| 2,056,956 A | 10/1936 | Carpenter |
| 2,337,370 A | 12/1943 | Broadfoot |
| 2,502,586 A | 4/1950 | Ottinger |
| 2,611,526 A | 9/1952 | George |

(Continued)

*Primary Examiner* — Christopher Demeree
(74) *Attorney, Agent, or Firm* — Merchant & Gould P.C.

(57) ABSTRACT

A collapsible bulk material container with a unique outer support sleeve and method of manufacture thereof are disclosed. The initial inner circumference of an oversized continuous woven tubular support sleeve is adjustably sized to mattingly match the outer peripheral circumference of a bulk material container forming member which it is designed to support. One or more adjustment tails are formed from the continuous sleeve material to accurately reduce the initial inner sleeve circumference to an adjusted inner circumference. The sizing operation can be performed during initial manufacture of the sleeve or prior to assembly of the sleeve to the forming member.

23 Claims, 9 Drawing Sheets

(56) References Cited

U.S. PATENT DOCUMENTS

| | | | |
|---|---|---|---|
| 3,123,254 A | 3/1964 | Rabby et al. |
| 3,257,068 A | 6/1966 | Wright |
| 3,423,009 A | 1/1969 | Palmer |
| 3,653,578 A | 4/1972 | Wood |
| 3,779,448 A | 12/1973 | Wootten |
| RE28,439 E | 6/1975 | Shepherd |
| 3,896,991 A | 7/1975 | Kozlowski et al. |
| 3,937,392 A | 2/1976 | Swisher |
| 3,945,493 A * | 3/1976 | Cardinal | B29C 61/0658 206/386 |
| 3,957,195 A | 5/1976 | Lin |
| 3,983,914 A | 10/1976 | Benson |
| 4,013,168 A | 3/1977 | Bamburg et al. |
| 4,115,909 A | 9/1978 | Corella |
| 4,176,748 A | 12/1979 | Beane |
| 4,226,327 A | 10/1980 | Ballard |
| 4,308,905 A | 1/1982 | Gallagher |
| 4,337,888 A | 7/1982 | Kudalkar |
| 4,362,199 A | 12/1982 | Futerman |
| RE31,191 E | 3/1983 | Connolly |
| 4,457,483 A | 7/1984 | Gagne |
| 4,538,385 A | 9/1985 | Kandarian |
| 4,622,693 A | 11/1986 | Mykleby |
| 4,655,366 A | 4/1987 | Sykes |
| 4,666,059 A | 5/1987 | Nordstrom |
| 4,850,506 A | 7/1989 | Heaps, Jr. et al. |
| 4,868,955 A | 9/1989 | Magnant et al. |
| 4,903,431 A | 2/1990 | Stoll |
| 4,940,820 A * | 7/1990 | Pithouse | B29C 61/006 112/440 |
| 4,997,125 A | 3/1991 | Glerum |
| 5,158,369 A | 10/1992 | Derby |
| 5,165,568 A | 11/1992 | Wischusen, III |
| 5,226,544 A | 7/1993 | Gallucci et al. |
| 5,285,957 A | 2/1994 | Halsell |
| 5,323,922 A * | 6/1994 | Lapoint, Jr. | B65D 88/1625 220/4.28 |
| 5,340,217 A | 8/1994 | Rothman |
| 5,405,006 A | 4/1995 | Burgdorf et al. |
| 5,518,168 A | 5/1996 | Mayer |
| 5,566,531 A | 10/1996 | Nordstrom et al. |
| 5,758,973 A * | 6/1998 | LaFleur | B65D 88/1612 383/121 |
| 5,759,644 A | 6/1998 | Stanley |
| 5,772,108 A | 6/1998 | Ruggiere, Sr. et al. |
| 6,431,435 B1 | 8/2002 | Jones et al. |
| 6,932,266 B2 | 8/2005 | Jones et al. |
| 7,328,833 B1 * | 2/2008 | Wiley | B65D 5/32 229/108.1 |
| 7,434,721 B2 * | 10/2008 | Feltz | B65D 5/029 229/109 |
| 8,978,964 B1 * | 3/2015 | Ruggiere, Sr. | B65D 5/445 229/164.1 |
| 2006/0027638 A1 * | 2/2006 | Jones | B65D 5/029 229/117.35 |

\* cited by examiner

BULK MATERIAL CONTAINER, SLEEVE AND METHOD OF ASSEMBLY

FIELD OF THE INVENTION

This invention relates generally to shipping and storage containers for bulk materials, and more particularly to such containers that use a tubular outer containment sleeve of flexible woven fiber material that snugly overlies a forming member, and which provides the primary containment strength for the container.

BACKGROUND OF THE INVENTION

A general description of known configurations of bulk material containers is detailed in the Background section of U.S. Pat. No. 6,932,266 entitled COLLAPSIBLE BULK MATERIAL CONTAINER, issued on Aug. 23, 2005. The U.S. Pat. No. 6,932,266 also describes a number of embodiments of improved bulk material container configurations, of the type to which the present invention is specifically directed. The U.S. Pat. No. 6,932,266 is fully incorporated herein by reference.

The bulk material containers of the general type described in the U.S. Pat. No. 6,932,266 have been well received and successful in the marketplace. They generally include a forming member having a plurality of interconnected sidewalls that are configurable to form a closed outer perimeter for a 3-dimensional internal geometric volume of the container. Bottom edges of the sidewalls are designed to be supported upon and carried by a pallet. A locking mechanism or assembly is operatively connected with the forming member sidewalls and maintains the forming member sidewalls in predetermined positions relative to one another when the container is empty. While the locking mechanism can be physically separable from the sidewalls, it can also form a physical extension of the sidewalls, as for example, a mechanism that folds inwardly along the bottom edges of the sidewalls and interconnects to form a bottom surface of the assembled container. The locking assembly initially maintains the sidewalls in predetermined fixed relationship to one another around the defined internal geometric volume when operatively assembled, and prevents the sidewalls from riding or sliding upward in a direction away from the pallet or support surface for the forming member during filling of the container. The forming member is typically configured from a relatively light-weight corrugated material which can, for example, be either of cellulose or plastic construction. When configured as an extension of the forming member sidewalls, the locking assembly can also be constructed from the same corrugated material as the sidewalls. An outer open ended tubular sleeve is sized to surround and snugly engage substantially the entire outer peripheral wall areas of the forming member, and assumes the defined geometric shape of the outer surface of the forming member. The outer sleeve is preferably constructed of woven polypropylene material and provides the necessary strength for containing the bulk material within the forming member, while the forming member provides the desired shape and transport rigidity and stability for the bulk material container system. A standard bag/liner can also be placed within the internal cavity defined by the forming member as an impermeable membrane between the bulk material and forming member, to protect bulk material of the container from contamination or the environment, and/or to retain liquids or flowable bulk materials within the internal cavity. Over the time that such containers have been in the marketplace, they have been used by a wide variety of customers for containing a broad range of diverse bulk materials.

Since the overlying tubular sleeve material provides the primary containment strength for a container of the type described, a relatively thin or light-weight forming member can be used, which reduces the cost of the container. The forming member's primary function is to provide an outer peripheral shape for the container that facilities loading of bulk material into the container and provides a defined 3-dimensional container configuration that enables container stackability and stability during transport. This cooperative interrelationship between the forming member and the outer sleeve requires the outer sleeve to snugly engage the outer walls of the forming member, and to prevent the forming member from expanding beyond its rupture tolerance as forces are applied to it by the contained bulk material. This is particularly an issue thereof when peripherally joined sidewalls of an operatively folded forming member are glued together to form a generally inelastic joint. Therefore, the inner circumference dimension of an outer sleeve and the outer circumference dimension of the cooperating forming member need to be within close tolerances of one another to ensure a snug fit. The outer and inner circumference dimensions respectively of the forming members and the outer sleeves are both generally manufactured to the same nominal dimensions plus or minus (+/−) a given tolerance. Random matching of forming members with sleeves during assembly has been an issue in the manufacture and assembly of such containers. For example, the forming member is typically made from corrugated materials such as cardboard which have low operative stretchability before rupturing, and can be manufactured within fairly tight outer circumference tolerances. On the other hand, the inner circumference manufacturing tolerances of the outer sleeve have generally varied significantly more than the tolerances of the forming member. Such sleeve tolerance variances can cause an issue when, for example, an outer sleeve manufactured to its maximum inside circumferential tolerance is matched in operative overlying engagement with a forming member that is manufactured to its minimum outer circumferential tolerance. In such instances, the sleeve does not initially snugly engage the outer surface of the forming member, which can lead to rupture of the forming member as it expands from applied forces by the bulk material before the overlying sleeve can fully counteract the radial bulk material forces applied to and through the forming member.

Recognizing this relative tolerance dilemma, assemblers of the containers have been prone to use labor intensive, costly steps of measuring and hand-sorting the outer sleeve and forming members to cooperatively match the sleeves and forming members to be assembled, according to their actual sizes. For example, those forming members having a "minus" tolerance would be matched with sleeves having a "minus" tolerance or nominal dimension, but not with sleeves having a "plus" tolerance dimension. Similarly, those forming members having a "plus" outer dimensional tolerance would be matched with sleeves having a "plus" inner parameter tolerance or a nominal dimension, but not with sleeves having a "minus" dimensional tolerance. Such pre-assembly forming member and sleeve sorting and matching operations are time consuming and costly functions. Further, the preassembly sorting and matching of sleeves and forming members generally makes the container assembly process unsuitable for automation.

Since the forming members can generally be manufactured within very small tolerances, the tolerance mismatch between forming members and the outer sleeves is primarily caused by the higher (+/−) tolerance ranges of the woven tubular outer sleeve. The present invention provides an outer sleeve and a method of manufacturing such sleeve that has an accurate inner circumference that closely matches the nominal outer peripheral dimension of the forming member, eliminating the costly and burdensome process of presorting and matching of sleeves to forming members, and facilitates automation of the container assembly process.

SUMMARY OF THE INVENTION

This invention uses existing industry accepted packaging materials to form a unique bulk container system that is universally applicable to the packaging of solid, semi-solid, granular or liquid materials. The bulk material container system of this invention comprises the advantageous features of known packaging techniques in a unique manner without suffering their respective shortcomings. A forming member of relatively inexpensive lightweight, generally corrugated, material has a plurality of interconnected sidewalls that define an internal geometric volumetric shape of the container in a manner that provides shape to the container and structural support for enabling stacking of loaded/filled containers. A locking assembly operatively connected with the forming member, holds and locks the forming member sidewalls in predetermined operative positions relative to one another, to define a desired geometric volume and shape. The locking assembly may comprise an extension of the forming member and may form a bottom of the container when operatively assembled. The forming member and locking assembly are collectively collapsible for storage and transport and are easily erected by folding into an operable box-like container configuration. The assembled bulk container system is designed to be placed on and carried by a pallet.

A tubular outer sleeve overlies and snugly engages substantially the entire outer peripheral sidewall areas of the forming member and operatively assumes the geometric shape of the outer surface of the forming member. The outer sleeve is preferably constructed of woven polypropylene material and provides the primary bulk material containment strength for the container, while the forming member provides the desired rigidity and shape to the bulk material container system.

This configuration of a bulk material container provides an advantage over conventional hard-walled containers, in allowing the forming member to be constructed of relatively lightweight material. However, it is important for the outer support sleeve to snugly engage the forming member sidewalls, to prevent the sidewalls from rupturing when large radial forces are applied to them when bulk material is loaded into the internal cavity of the container. The present invention provides a unique sleeve construction and method of manufacture thereof, which enables the sleeve to be manufactured to dimensional tolerances that closely match those of the forming member to which the sleeve will be applied, thereby assuring that the operative snug-fit requirement between the forming member and the overlying sleeve will be met.

According to one aspect of the invention, the outer sleeve is continuously woven in tubular configuration with opposed open ends so that it can be operatively slid in overlying engagement with the forming member sidewalls. The outer sleeve is initially woven to have an inside circumference dimension that is larger than the nominal outer circumference dimension of the forming member, referred to as the "nominal length", with which it will be mated. The sleeve is then further processed by bonding opposing surfaces of the sleeve along at least one longitudinal side of the sleeve in a manner that reduces the initial oversized inner circumference of the sleeve to an adjusted inner circumference dimension that matches the nominal length dimension of the forming member with which it will be operatively mated. The sleeve sizing operation can be readily incorporated into and form an operative step of an assembly line operation in which the tubular sleeve is formed, or can be later performed prior to the container assembly step of applying the sleeve to the forming member.

According to one aspect of the invention, there is provided an outer support sleeve of a type operable to snugly engage an outer surface of a forming member of a bulk material container, comprising: (a) a continuously woven tubular sleeve having a sleeve length, longitudinally extending between opposed open ends, and a sleeve initial inner circumference dimension; (b) a first longitudinally extending circumference adjustment tail of the continuous sleeve material, extending along the length of the sleeve; and (c) wherein the tail is formed by a bonding strip longitudinally extending along one edge of the sleeve when in a flattened configuration, with opposed surfaces of the sleeve engaging one another, wherein the bonding strip fixedly bonds the opposed engaged surfaces of the sleeve to one another in a manner which accurately defines an adjusted inner circumference dimension of the sleeve that is less than the initial sleeve inner circumference dimension. According to a further aspect of the invention, the outer support sleeve is constructed of woven polypropylene material. The woven sleeve material can also be impregnated with a coating of polypropylene material to provide a liquid barrier.

According to one aspect of the invention, the sleeve bonding strip comprises stitching. According to another aspect of the invention, the bonding strip could comprise an ultrasonically formed weld bond or could also comprise a hot melt formed bond.

According to a further aspect of the invention, the outer support sleeve includes multiple circumference adjustment tail configurations. For example, the outer support sleeve could further comprise: (a) a second longitudinally extending circumference adjustment tail of the sleeve material, formed by the same bonding strip technique as that used to form the first circumference adjustment tail, wherein the second circumference adjustment tail is positioned diametrically oppositely disposed across the flattened sleeve from the first circumference adjustment tail; and (b) wherein the bonding strips of the first and second circumference adjustment tails, in combination, accurately define the adjusted inner circumference dimension of the sleeve. According to yet a further aspect of the invention, the first and/or second circumference adjustment tails each has a laterally measured width as measured from an inner edge of its bonding strip to an outer longitudinal edge of the sleeve when in its flattened configuration, of about at least 0.5 inches. According to yet a further aspect of the invention, the first and second circumference adjustment tails each have a laterally measured width as measured from an inner edge of its bonding strip to an outer longitudinal edge of the sleeve when in its flattened configuration, in a range of between about 0.25 inches to about 0.75 inches.

According to yet a further aspect of the invention, there is provided a container for bulk materials, comprising: (a) a forming member comprising a plurality of foldably interconnected sidewalls extending between upper and lower edges and operative when folded to cooperatively form and encircle an internal cavity for receiving bulk materials; (b)

a locking assembly cooperatively engaging the sidewalls to operatively define and fix the sidewalls in predetermined relative positions, wherein the locking assembly forms in part, a bottom surface of the cavity; (c) an outer tubular support sleeve made of continuous woven material, having a sleeve length longitudinally extending between opposed open ends and having a sleeve initial inner circumference dimension, further comprising: (i) a first longitudinally extending circumference adjustment tail of the continuous sleeve material, extending along the length of the sleeve; and (ii) wherein the sleeve is formed by a bonding strip longitudinally extending along one edge of the sleeve when in a flattened configuration, with opposed surfaces of the sleeve engaging one another; wherein the bonding strip fixedly bonds the opposed engaged surfaces of the sleeve to one another to accurately reduce the sleeve initial inner circumference dimension to an adjusted inner circumference dimension; and (d) wherein the sleeve having the adjusted inner circumference dimension being is sized, arranged and configured to operatively overlie and snugly engage substantially the entire outer surfaces of the forming member sidewalls.

Accordingly to a further aspect of the invention, the sleeve of the above-described container comprises woven polypropylene material. According to yet a further aspect of the invention, the woven sleeve material is impregnated with a coating of polypropylene material to make the material impervious to liquid penetration. According to yet a further aspect of the invention, the bonding strip of the sleeve comprises stitching. According to yet a further aspect of the invention, the bonding strip of the sleeve comprises an ultrasonically formed weld bond or a hot melt formed bond.

According to yet a further aspect of the invention, the sleeve of the above-described container further comprises a second longitudinally extending circumference adjustment tail of the continuous sleeve material, formed by the same bonding strip technique as that of the first circumference adjustment tail, wherein the second circumference adjustment tail is diametrically oppositely disposed across the sleeve from the first circumference adjustment tail, and wherein the bonding strips of the first and the second circumference adjustment tails in combination accurately define the adjusted inner circumferent dimension of the sleeve.

According to yet a further aspect of the invention, the bulk material container forming member comprises corrugated material having sidewalls that are fixedly end-bonded together to form a peripheral wall continuously encircling the internal cavity of the container, wherein the sidewalls have a nominal outer peripheral circumference dimension; and wherein the adjusted inner circumference dimension of the sleeve is substantially the same as the nominal outer peripheral circumference dimension of the forming member sidewalls. According to yet a further aspect of the invention, the fixedly end-bonded together sidewalls of the forming member can be folded-in-half prior to operative assembly in 3-dimensional container form, and the sleeve can be operatively engaged to overlie the forming member while the forming member is configured in its folded-in-half configuration.

According to yet a further aspect of the invention there is provided a method of manufacturing an outer support sleeve for a bulk material container of a type having a forming member comprising a plurality of foldably interconnected sidewalls extending between upper and lower edges and operative unfolded and held in place by a locking assembly to cooperatively form and encircle an internal cavity receiving bulk materials, wherein the outer support sleeve is configured to snugly operatively overlie substantially the entire outer surface area of the forming member sidewalls to counteract radial forces exerted by bulk materials within the container on the sidewalls, comprising the steps of: (a) weaving a continuous open-ended tubular sleeve of material having a first inner sleeve circumference dimension; (b) flattening the tubular sleeve along its longitudinal length such that opposed upper and lower portions of the flattened sleeve engage each other across their flattened length; (c) fixedly bonding together the upper and lower engaged portions of the flattened sleeve material to form a first bonding strip along a first longitudinal edge of the flattened sleeve material, and a first adjustment tail of the continuous sleeve material laterally extending outwardly from the first bonding strip along the first longitudinal sleeve edge; wherein an inner edge of the first bonding strip reduces the first inner sleeve circumference dimension and defines an accurately sized adjustment sleeve inner circumference dimension of the sleeve material. According to yet a further aspect of the method of the manufacturing the outer support sleeve, the bonding step could comprise stitching the upper and lower engaged portions of the flattened sleeve material along the first longitudinal edge of the flattened sleeve material, or alternatively could comprise an ultrasonic welding bonding step or a hot melt bond forming step.

According to yet a further aspect of the invention, the method of manufacturing an outer support sleeve as described above can further include a step of fixedly bonding together the upper and lower engaged portions of the flattened sleeve material to form a second bonding strip along a second longitudinal edge of the flattened sleeve material that is diametrically opposed from and parallel to the first longitudinal edge, and a second adjustment tail of the continuous sleeve material laterally extending outwardly from the second bonding strip along the second longitudinal sleeve edge, wherein inner edges of the first and second bonding strips along the first and second longitudinal edges of the flattened sleeve, in combination, define the accurately sized adjusted sleeve inner circumference dimension of the sleeve. According to yet a further aspect of the method of manufacturing the tubular sleeve, the material used to weave the sleeve could comprise polypropylene material.

Typically, in manufacturing the outer sleeve, the tubular sleeve is continuously formed and passes along an assembly line of operations wherein strategic markings and/or graphics and/or lettering and instructions are printed upon at least the outer surface of the sleeve. The sleeve can also be subjected to steps that form strategically located connector receptor slots or other connecting mechanisms for cooperatively engaging portions of the forming member or locking assembly portions of the container. The completed tubular sleeve material can be rolled into a cylindrical roll for shipping to a container assembly facility where the roll will be cut into individual sleeves for overlying a forming member of individual containers. Alternatively, the tubular side-bonded sleeve material can be cut into individual container sleeve lengths on the sleeve assembly line and bundled for shipment to an assembler. Alternatively, if the entire sleeve and forming member assembly is performed at the same facility, the tubular side bonded sleeve material can be slid over folded-in-half end-bonded forming members, and cut to length before or after operative application of the sleeve to the forming member.

Typically, however, the sleeve material will be shipped after printing and other marking operations either in roll or cut-to-length bundles to another facility for application to completed forming members. The completed forming members/locking assembly and applied sleeve units are then bundled for subsequent shipment to end users.

Besides providing a mechanism for accurately adjustably matching the inner circumference of the sleeve to the outer peripheral circumference of a sleeve to the outer peripheral circumference of a forming member, the adjustment tails of the sleeve provide mechanical gripping means for facilitating manual and/or automated assembly of a sleeve to a forming member.

These and other features of the invention will become apparent from a more detailed description of preferred embodiments of the invention as described below.

BRIEF DESCRIPTION OF THE DRAWING

Referring to the Drawing, wherein like numerals represent like parts throughout the several views.

DETAILED DESCRIPTION

One embodiment of a bulk material container assembly of the type to which the present invention applies is described below with reference to FIGS. 1-8. Descriptions of alternative bulk material container embodiments, of their use and construction, of the materials that are usable to construct the container assemblies, and other alternatives applicable to the invention are described more fully in U.S. Pat. No. 6,932, 266 which is fully incorporated herein by reference.

Figure 1:
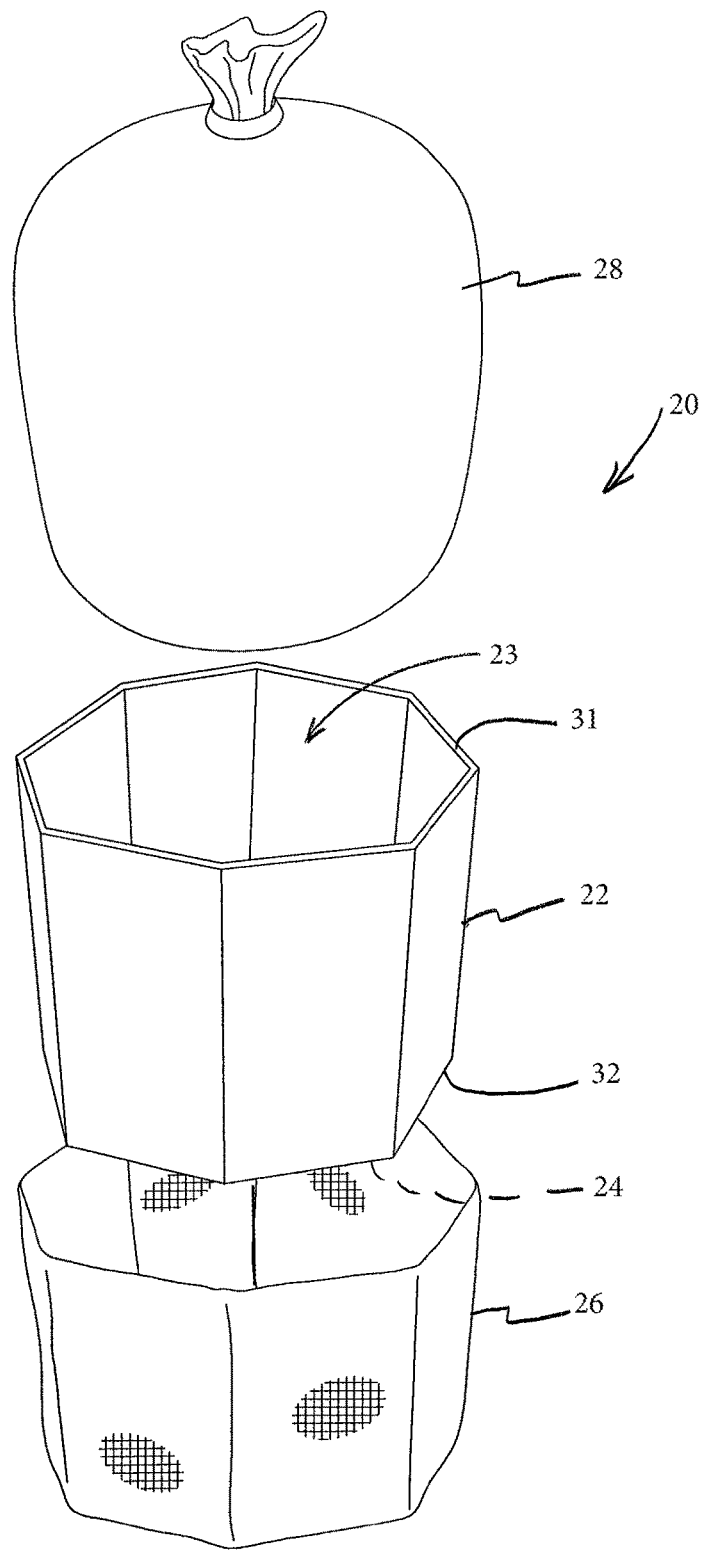
FIG. 1 is an exploded perspective view of one embodiment of a bulk material container assembly applicable to the present invention, and having a forming member, a shape defining locking assembly, an outer sleeve member and an optional bag/liner.

Referring to FIG. 1, a bulk material container assembly is generally illustrated at 20. For ease of description, the bulk material container assembly will hereinafter be referred to as "the container". The container 20 generally includes a forming member 22, a locking assembly or mechanism 24, an outer support sleeve 26 and an optional inner liner 28. The forming member 22 provides a defined geometric shape and structural stability to the container, while the sleeve 26 is sized to cooperatively and snugly engage and circumferentially surround at least substantially the entire outer surface area of the forming member sidewalls 22, and provides the primary bulk material containment strength for the container. The optional inner bag/liner 28 is generally placed within the forming member 22 and directly contacts the bulk material, to protect the container contents from contamination and/or to retain flowable or liquid contents from leaving or leaking out of the container.

The forming member 22 is preferably configured from a relatively light-weight corrugated material which can, for example, be either of cellulose or plastic construction. The forming member is folded along a plurality of fold lines to form a plurality of adjoining upright sidewalls configured to form a closed perimeter shell as shown in FIG. 1. Closed perimeter forming member sidewalls define with a lower surface, an internal geometric volumetric shape 23 that defines a bulk material storage portion of the container. The bottom edges of the forming member sidewalls are designed to be supported and carried by a pallet. While a pallet can contain more than one bulk container, typically the container is sized and configured to be carried by a single pallet. The locking mechanism maintains the forming member sidewalls in predetermined upright fixed position relative to one another when a container is empty. While the locking mechanism can be physically separated from the sidewalls, in the embodiment illustrated in FIGS. 1-8, the locking mechanism or assembly comprises lower extension portions of the forming member's sidewalls, generally illustrated at 24 in FIG. 2. The lower extension locking portions 24 of the sidewalls fold inwardly along the bottom edges 32 of the sidewalls and overlap and interconnect with one another to fix and maintain the forming member sidewalls in predetermined spaceal relationship with one another when operatively assembled, around the defined internal geometric volumetric shape 23. The interlocking lower locking assembly portions 24, when operatively assembled, also form and define a bottom surface of the container. Besides fixing the geometric footprint formed by the sidewalls, the locking assembly also prevents the sidewalls from riding or sliding upwardly, away from the bottom of the forming member during filling or transporting of the container. For additional details, description of materials and design considerations relating to bulk material containers of the general type described above, the reader is referred to U.S. Pat. No. 6,932,266.

Figure 2:
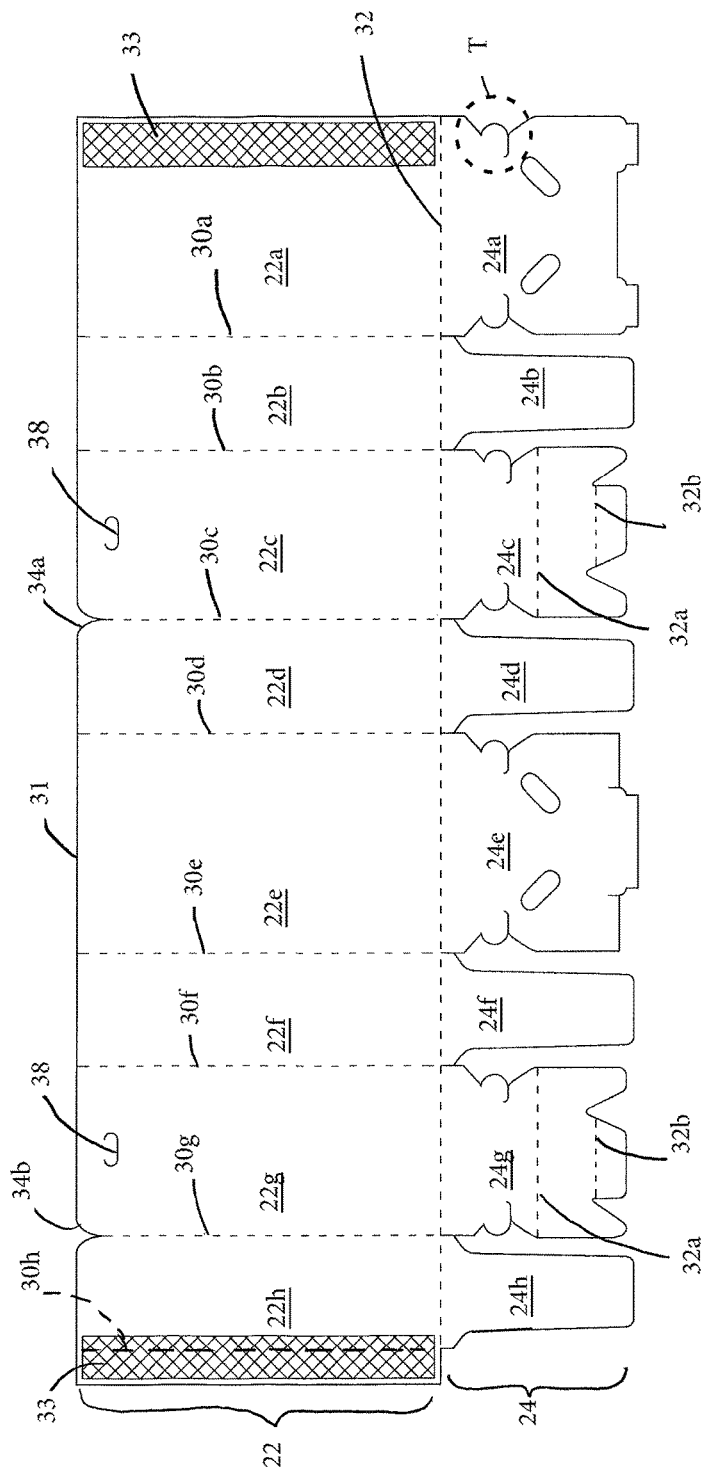
FIG. 2 is a view illustrating on a planar sheet, a pattern and folding configuration of the forming member and locking assembly of the bulk material container assembly of FIG. 1.

Referring to FIG. 2, a patterned substrate of an integrally connected forming member 22 and locking assembly 24 is illustrated as it would appear in plannar form after being die cut and scored for folding lines, from a sheet of corrugated material such as cardboard. In the embodiment illustrated the substrate is made of corrugated 0.25 inch think cardboard. The substrate shown is scored along vertical fold lines 30a-30h that divide the forming member 22 into eight adjacent and integrally connected sidewalls 22a-22h. The sidewalls 22 extend between an upper edge 31 to the horizontal lower fold line 32, which also defines the upper boundary (as shown in FIG. 2) of the integrally connected locking assembly member projections 24a-24h. Locking assembly member projections 24a-24h continuously extend respectively from the sidewalls 22a-22h, and are joined thereto along the horizontal fold line 32. When the corrugated material which forms the forming member sidewalls 22 and the locking mechanism extensions 24 of the sidewalls 22 are folded along the fold lines 30 and 32 and interconnected to form the octagon shaped forming member configuration 22 of FIG. 1, the material at the fold line 32 defines the lower edges of the forming member sidewall segments 22a-22h, as well as the upper edges of the locking member projections 24a-24h that interconnect to form the locking mechanism of the container 20. The locking assembly members 24c and 24g also include secondary horizontal folding lines 32a and 32b, as illustrated in FIG. 2, that allow selective folding of portions of the locking assembly members 24c and 24g which facilitate interconnection of the locking members during assembly of the container. The two end sidewalls 22a and 22h each has a vertical bonding strip portion, generally designated at the cross-hatched portions 33. The bonding strip portions 33 are sized, shaped and configured to overlap with and to be glued to one another when the forming member is operatively folded along the vertical fold lines 30a-30h, to operatively form a peripherally continuous 3-dimensional forming member as generally illustrated in FIG. 1.

In the embodiment illustrated, the forming member 22 as above described is folded-in-half and glued together along the vertical bonding strips 33, to form a bonded continuous relatively inelastic outer peripheral wall surrounding the internal geometric volume 23 that will hold the bulk material. Such configuration is preferred over other designs of forming members such as described in, for example, U.S. Pat. No. 6,932,266 which describes several embodiments of forming members incorporating a slidable interconnection of the opposed interconnected ends of the forming member. The glued configuration of the forming member is preferred over such slidably interconnected forming member, since the rigid bonding of the glued together ends of the forming member enables the assembled member to better maintain its 3-dimensional shape which results in better stacking and transport stability of a loaded bulk container.

Figure 3:
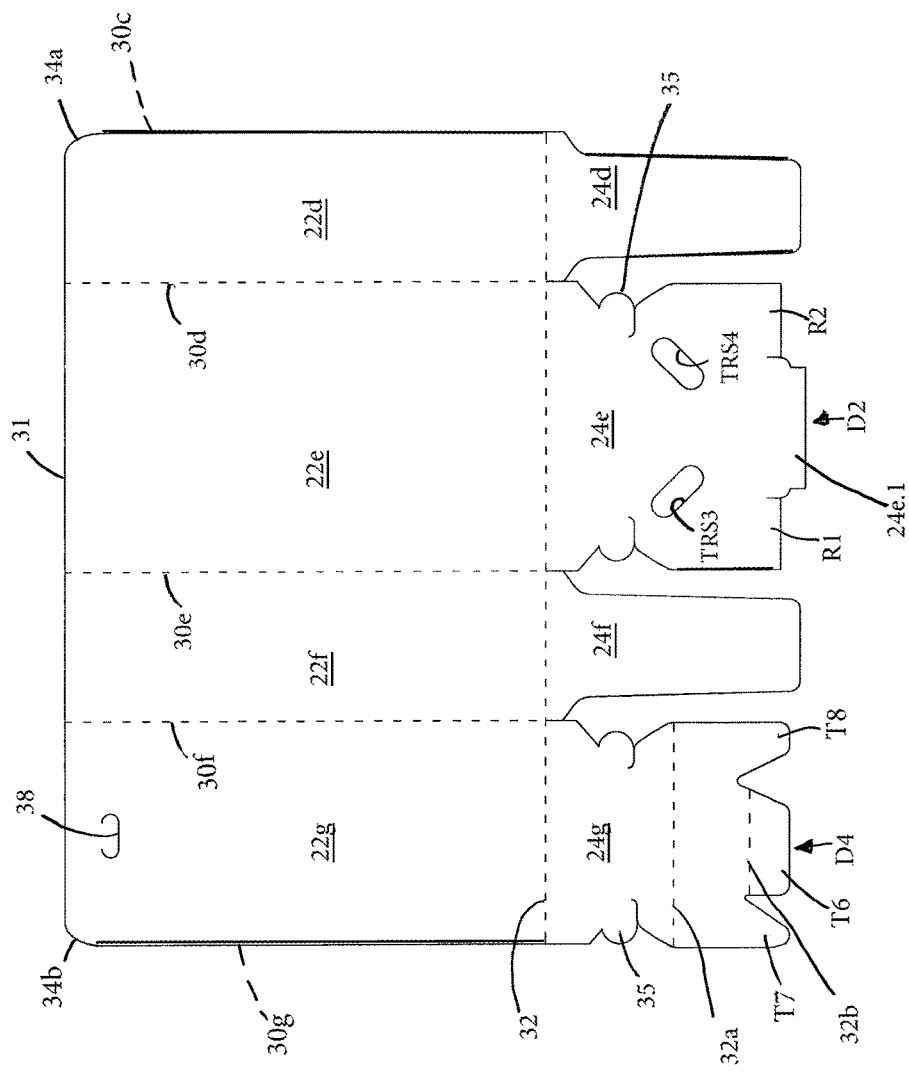
FIG. 3 is a view of one side of the forming member and locking assembly of FIG. 2 as it would appear when folded upon itself along the folding lines 30c and 30g of FIG. 2, with the opposite or back side thereof not shown.
Figure 4:
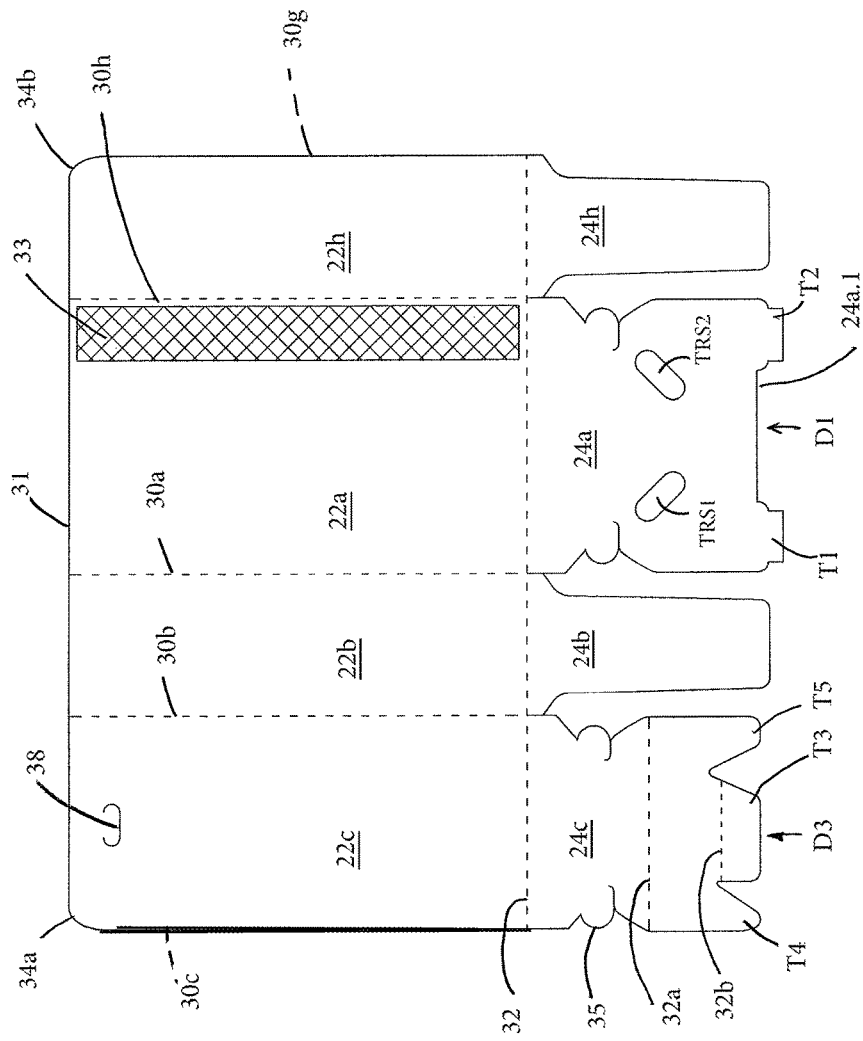
FIG. 4 is an view of the folded forming member and locking assembly of FIG. 3, as viewed from the opposite side thereof, and with the back side thereof not shown.

FIGS. 3 and 4 illustrate views from opposite sides of the forming member and connected locking assembly of FIG. 2, as they would appear when its bonding strips 33 are fixedly glued to one another to form a continuous ring, and when the substrate is folded-in-half upon itself along the folding lines 30c and 30g. The gluing operation, to fixedly bond the vertical bonding strips 33 to one another may be performed at the same manufacturing facility that produces the die cut plannar substrate of FIG. 2, or may be performed at subsequent assemblies or at end user facilities. Accordingly, the combined forming member/locking assembly may be bundled and shipped between assembly facilities and/or end users in plannar substrate form as in FIG. 2, in glued, folded-over configuration as in FIGS. 3 and 4, or in glued folded-over configuration with attached sleeve.

The locking assembly members 24 (of FIG. 2) are described in more detail with respect to FIGS. 3 and 4. Referring thereto, the locking member extensions segment 24a and 24e are configured to cooperatively engage one another during assembly of the container to its open 3-dimensional configuration as illustrated in FIG. 1. Referring to FIG. 4, the locking segment 24a is shown as extending between its proximal connection to the sidewall 22a along the fold line 32, and a distal end D1. The distal end D1 is configured to define a primary tab receptor slot 24a.1 and a pair of projecting tab portions T1 and T2, extending distally outward from the locking segment 24a on opposite sides of the primary tab receptor slot 24a.1. The locking segment 24a also has oppositely disposed side edges S1 and S2. Each of the side edges S1 and S2 has an outwardly projecting sleeve retaining tab member 35.

Referring to FIG. 3, the locking segment 24e is shown extending between its proximal connection to the sidewall 22e along the fold line 32, and a distal end D2. The distal end D2 is configured to define a primary tab 24e.1 outwardly projecting from the distal end D2, and a pair of tab receptor seat portions R1 and R2, spaced inwardly back from the distal end of the primary tab 24e.1 of the locking segment 24e, on opposite sides of the primary tab 24e.1. The locking segment 24e also has oppositely disposed side edges S3 and S4. Each of the side edges S3 and S4 has an outwardly projecting sleeve retaining tab member 35 of the same configuration as the same numbered sleeve retaining tab members of the locking segment 24a of FIG. 4.

The locking segment 24a has a pair of laterally aligned and spaced, oppositely angled tab receptor slots TRS1 and TRS2, spaced back from the distal end D1 of the locking segment 24a. Similarly, the locking segment 24e has a pair of laterally aligned and spaced, oppositely angled tab receptor slots TRS3 and TRS4, spaced back from the distal end D2 of the locking segment 24e. When the folding member 22 and locking assembly are operatively assembled in bulk container configuration, the locking member extensions 24a and 24e operatively interconnected with one another. The primary tab 24e.1 of the locking member portion 24e cooperatively slides within the primary tab receptor slot 24a.1 of the locking member portion 24a, and the projecting tab portions T1 and T2 of the locking member portion 24a cooperatively overlie the pair of tab receptor seat portions R2 and R1 respectively to maintain the distal end portions D1 and D2 of the locking member portions 24a and 24e respectively in operative engagement with one another.

The locking member extension portions 24c and 24g are identically shaped. Referring to FIGS. 3 and 4, the locking segments 24c and 24g are shown as extending between their proximal connection to the sidewalls 22c and 22g respectively along the fold line 32, and their respective distal ends D3 and D4. The locking segments 24c and 24g each has a primary tab portion T3 and T6 respectively, extending distally outward from the central portion of their respective locking segments. The locking segment 24c has a pair of projecting tab portions T4 and T5 extending distally outward from the locking segments 24c on opposite sides of the centrally located primary tab T3. Similarly, the locking segment 24g has a pair of projecting tab portions T7 and T8 extending distally outward from the locking segments 24g on opposite sides of its centrally located primary tab T6. During assembly of the bulk container into operative position, the locking segments 24c and 24g are folded along the fold line 32 inwardly toward one another. Both of the locking segments 24c and 24g partially orthogonally overlap the locking segments 24a and 24e, from opposite directions, and form a locking relationship with the locking segments 24a and 24e as follows. The projecting tabs T4 of locking segment 24c, and T8 of locking segment 24g cooperatively respectively retainably engage the tab receptor slots TRS 4 and TRS 3 of the locking segment 24e in locking manner. The projecting tab T5 of locking segment 24c, and T7 of locking segment 24g respectively cooperatively retainably engage the tab receptor slots TRS1 and TRS2 of the locking segment 24a in locking manner. Each of the oppositely disposed side edges of the locking member segments 24c and 24g also includes an outwardly projecting sleeve retaining tab member 35 of the same configuration and construction as those sleeve retaining tab members of like number of the locking segments 24a and 24e, previously described.

The identically shaped sidewall lower extension segments 24b, 24d, 24f and 24h are included within the designation of "locking assembly segments" since they share a common physical location below the lower fold line 32, and are cooperatively inwardly folded along with the other locking assembly segments previously described, to collectively define therewith the 3-dimensional shape of the container. It will be noted that even though the lower extension segments 24b, 24d, 24f and 24h, referred to as "locking" segments, cooperatively sidably engage others of the locking assembly segments, they do not include any specific "interlocking" mechanisms like, for example, those of locking segments 24a, 24c, 24e and 24g previously described.

In the embodiment illustrated, the length (in the horizontal direction as illustrated in FIGS. 3 and 4) of the folded-in-half and glued forming member configuration, is 72 inches, and the combined height (measured in the vertical direction of FIGS. 3 and 4) of the forming member and locking assembly segments, is 66 inches. The total operative length of the plannar unfolded substrate illustrated in FIG. 2 is 144 inches as measured from the folding line 30h on the left, to the right edge of the forming member segment 22a. These dimensions are for a relatively large bulk material container that would occupy, when operatively unfolded, virtually the entire surface area of a 40 inch by 48 inch pallet, which is an industry standard pallet size for certain industries such as the meat packing industry. The container, and thus the forming member sizes, generally dictated not only by the nature and type of bulk materials to be loaded into the container, but also by the industry standardized sizes of the pallets that will be used in the various industries to move and transport the containers. Accordingly, the size and outer peripheral shapes of the containers can vary widely from, for example, smaller folded-in-half and glued forming member configurations having lengths of 36 to 40 inches, all the way up to larger containers such as that illustrated in the embodiment disclosed above, of 72 or more inches.

Figure 5:
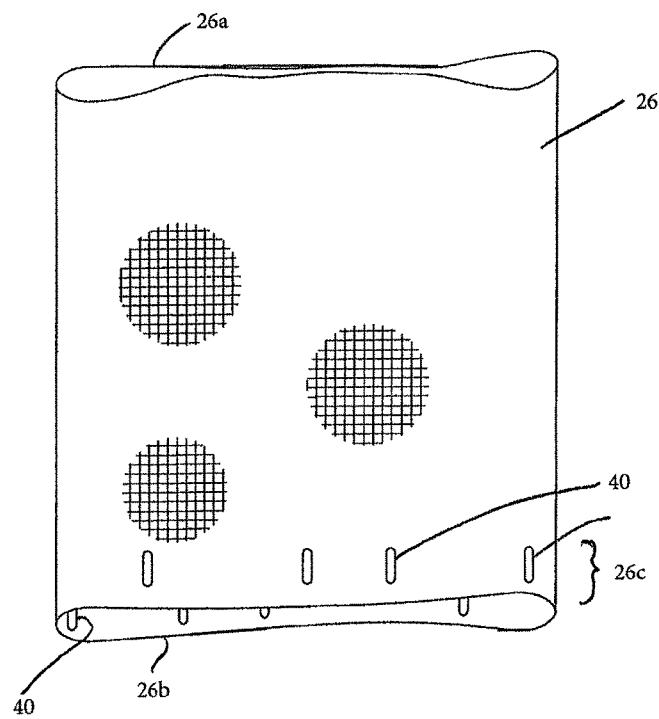
FIG. 5 is a diagrammatic pictorial view of an outer sleeve member of the bulk material container assembly of FIG. 1, illustrating circumferentially spaced receptor slots formed through the sleeve material adjacent the lower end thereof.

The outer support sleeve 26 is preferably constructed of the same types of materials well-known in the art, that are used for making flexible intermediate bulk containers (FIBCs). The sleeve is preferably woven from flexible fiber materials, preferably polypropylene materials, which are known for their strength and lightweight. The sleeve 26 of known bulk material containers forms a continuous tubular open ended and seamless sleeve requiring no sewing or stitching such as illustrated in FIG. 5. After weaving, the sleeve material may be impregnated with a polypropylene coating, which adds further strength to and waterproofs the woven material. As initially woven, the open ended tubular sleeve is generally of cylindrical configuration around a central axis. However, when operatively slid over a forming member, the sleeve assumes the geometric configuration of the outer peripheral walls of the forming member. The sleeve is generally slid over the forming member when it is configured in the flattened folded-in-half configuration as illustrated in FIGS. 3 and 4, which is generally rectangular in shape. However, when the forming member is opened to define an internal geometric volume within its sidewalls, the outer peripheral shape of the forming member, and the thus the shape of the overlying sleeve changes to its operative designed shape, such as the octangular shape illustrated in the disclosed container embodiment.

The sleeve is typically manufactured by an entity other than those providing the forming member/locking assembly configurations, both of which may be different from the entity finally assembling the bulk container for operative use. A plurality of sleeves may be packed in a continuous roll of sleeves which require separation at the point of the container assembly. The sleeve material can simply be cut to a desired length by a shear, by laser, or by a hot knife technique that also conditions the woven material along the cut to prevent unraveling thereof. Alternatively, the individual sleeves may be cut to their desired lengths at their point of manufacture, and bundled for shipment to an assembler of the container. The sleeve is preferably cut to a length that will cover virtually the entire outer peripheral surface of the forming member sidewalls and to extend slightly below the lower edge 32 of the assembled forming member, for folding inwardly below and in engagement with the locking assembly 24, as hereinafter described.

FIG. 5 is a diagrammatic pictorial view of a sleeve, which extends from an upper edge 26a to a lower edge 26b. The "length" of the sleeve, as discussed above, is measured between its upper 26a and lower 26b edges. In the embodiment illustrated in FIG. 5, the sleeve includes a plurality of circumferentially spaced generally vertical slits 40 adjacent to but vertically spaced from the lower edge 26b of the sleeve 26. The vertical slits 40 are preferably cut through the polycoated sleeve's surfaces and woven material with a hot blade or wire, that results in no unraveling of the exposed sleeve threads along the slit edges, in a manner well recognized by those skilled in the art. The slits are vertically located within the circumferential strip of sleeve material designated at 26c in FIG. 5, which extends approximately 10 inches downwardly below the fold line 32 defining the lower edge of the forming member 22 when the sleeve is operatively slidably engaged with the forming member. In the embodiment illustrated, the sleeve material 26c that extends below the fold line 32 is configured to be operatively folded inwardly and into engagement with the bottom surfaces of the locking members 24 when the container is fully assembled. In the embodiment illustrated, the slits 40 are sized, shaped and positioned to cooperatively and retainably engage opposed pairs of the sleeve retaining tab members 35 of the locking assembly segments, to maintain the sleeve in its desired position overlying the forming member and to prevent the sleeve from arising up along the outer sidewalls of the forming member during assembly, handling and loading of the container.

An assembler of the container typically receives the forming member/locking assembly in a folded-in-half condition as shown in FIGS. 3 and 4, with the distal ends of the forming member sidewalls 22a and 22h already bonded together by the vertical bonding strips 33. The sleeve may or may not already have been applied to the folded forming member/locking assembly configuration. If the sleeve 26 is not yet been applied to the container, it is pulled over the collapsed forming member 22/locking assembly 24 configuration, typically starting at the upper edge 31 of the forming member 22 and sliding the sleeve downwardly over the forming member until the leading (bottom) edge 26b of the sleeve 26 extends below the lower fold line 32 of the forming member 22 by the distance or length generally illustrated at 26c (FIG. 5) and until the top edge 26a of the sleeve coincides with or is positioned slightly below the upper edge 31 of the forming member. This step may also have previously been performed by the sleeve or forming member manufacturer, or by a subsequent pre-assembler who then ships the forming member/locking assembly with attached sleeve to the ultimate end assembler of the bulk container. The excess sleeve material 26c adjacent the bottom edge of the sleeve is intended and configured to be folded under the bottom of the assembled bulk container as hereinafter described.

To configure the bulk container into a 3-dimensional shape, the forming member/locking assembly as shown in FIGS. 3 and 4, with overlying sleeve 26 as previously described, is inverted from that position shown in FIGS. 3 and 4 and placed on a generally planar support surface with the upper edge 31 of the forming member resting on the support surface. The sidewalls 22 are pulled apart from their folded-in-half configuration in a manner to fold the respective sidewalls along their vertical fold lines 30a-30h so as to define an internal geometric solid shaped cavity 23 formed by the peripherally connected inner sidewall surfaces. In the embodiment illustrated, the formed cavity 23 will have a generally octagonal shape due to the fact that the forming member has eight sidewall segments 22a-22h. In such position, the locking assembly segments 24 will extend in an upward direction from the inverted sidewalls 22. The locking assembly segments 24 are then folded along the horizontal fold line 32 in inward directions toward the cavity and interlocked to fix and lock the geometrical perimeter shape of the sidewalls.

The first segments of the locking mechanism to be inwardly folded are the four identically shaped segments 24b, 24d, 24f and 24h. When folded inwardly toward the center of the container these segments form the innermost members of the bottom of the container and of the enclosed internal geometric volume 23. Next, the opposed locking segments 24a and 24e are folded inwardly toward one another until their distal ends D1 and D2 respectively cooperatively retainably engage one another near the center of the container, with the primary tab 24e.1 of segment 24e being cooperatively received by the primary tab receptor slot 24a.1 of the segment 24a. The outer tab members T1 and T2 of locking segment 24a are cooperatively respectively engaged by and slide under the tab receptor seat portions R2 and R1 of locking segment 24e.

Figure 6:
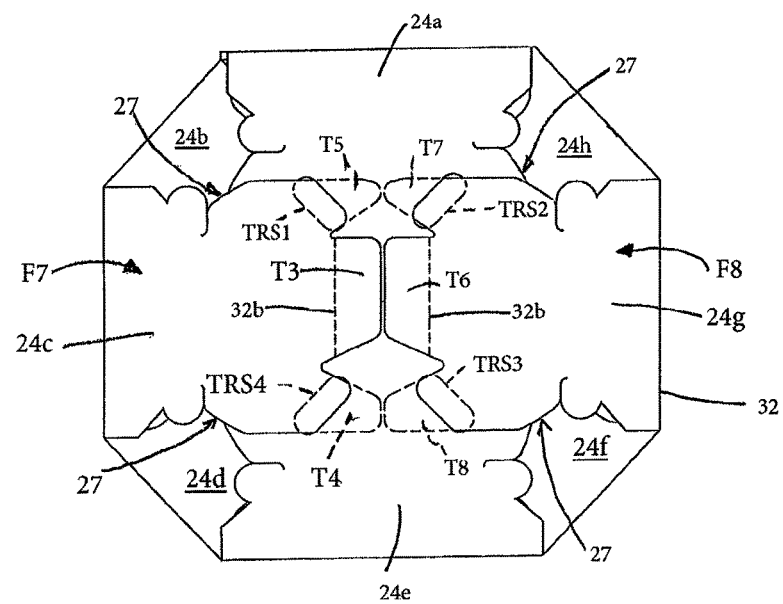
FIG. 6 is a bottom diagrammatic view of the forming member and locking assembly of FIGS. 2-4 illustrating the locking assembly segments folded inwardly and interlocked to form a closed bottom locking configuration for the container that locks the sidewalls of the forming member in fixed relative spaced positions.
Figure 7:
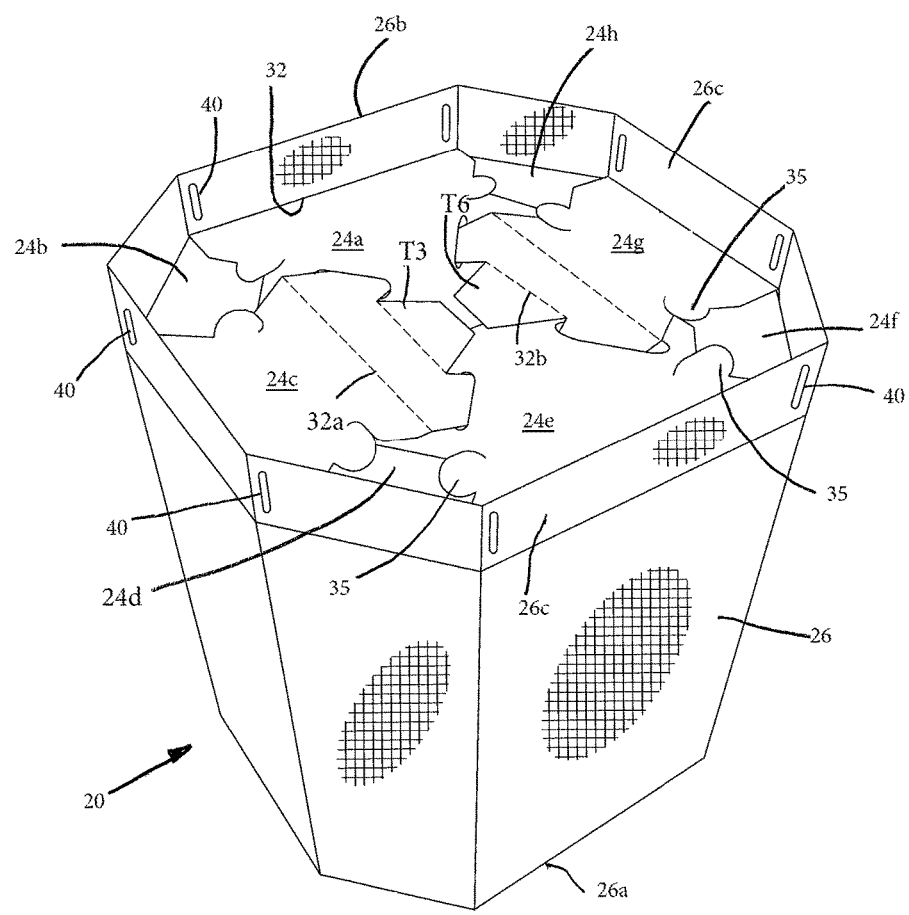
FIG. 7 is a pictorial bottom/side perspective view of the bulk material container during assembly, illustrating the bottom portion of the sleeve positioned in an extended manner below the general plane of the assembled locking assembly bottom of the container as it would appear prior to folding it inwardly against and operatively connecting it to sleeve retaining tab members of the locking assembly.

The final two locking segments 24c and 24g are then folded inwardly toward each other and respectively interlock with the underlying locking segments 24a and 24e. When interlocked, the outer tab portions T4 and T5 of locking member 24c cooperatively retainably slide within the and are retained by the tab receptor slots TRS 4 and TRS 1 respectively, and the outer projecting tabs T7 and T8 of the locking member 24g are cooperatively received and retainably held by the tab receptor slots TRS 2 and TRS 3 respectively. Bottom views of the assembled locking segments are shown in FIGS. 6 and 7. FIG. 6 is a bottom plan view of the completed locking assembly, and FIG. 7 is a perspective bottom and side view of the partially assembled bulk container 20 illustrating the outer sleeve portion 26c extending upwardly beyond the general plane of the interlocked locking assembly segments 24, as it might appear immediately before folding toward and against the interconnecting assembly segments 24. As shown in FIG. 6, the overlapping and interconnected locking member 24 form vertical gaps, generally depicted at 27 between the first folded corner segments 24b, 24d, 24f and 24h and the overlying locking member segments 24a, 24c, 24e and 24g, into which portions of the folded-over sleeve 26c can be tucked.

Figure 8:
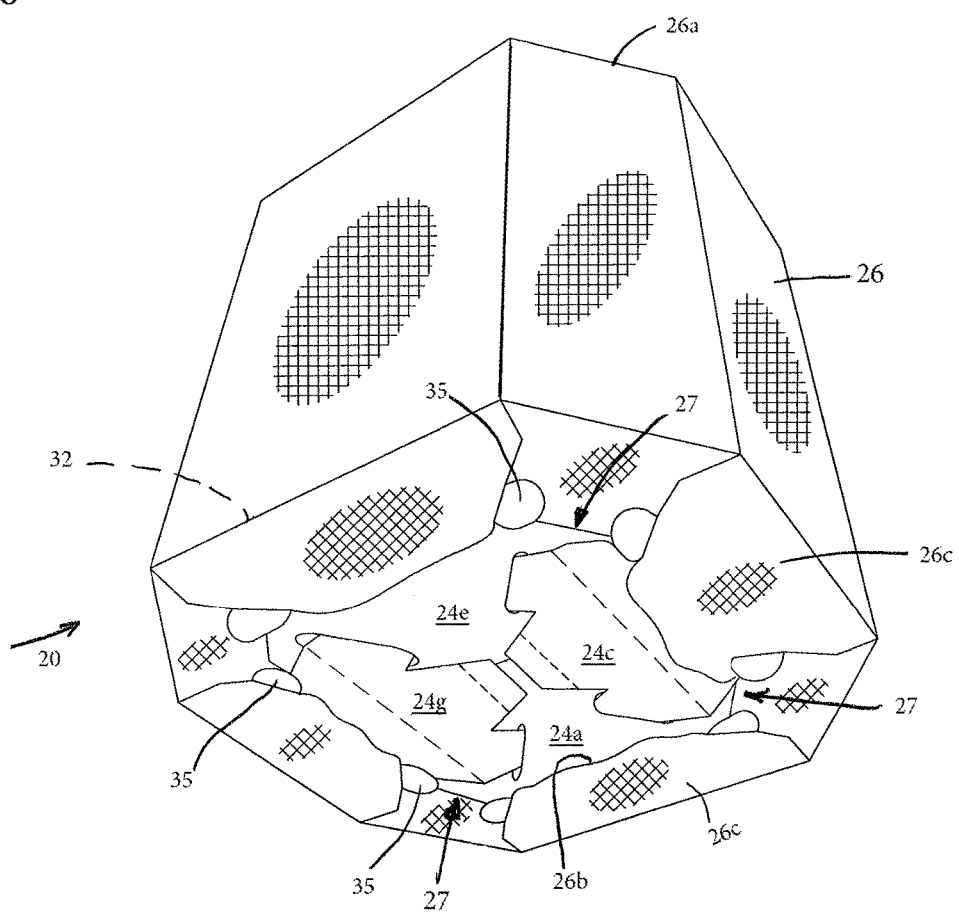
FIG. 8 is a pictorial bottom/side perspective view of a completed assembly of the bulk material container of FIG. 7, illustrating the sleeve folded against the bottom of the container with its lower receptor slots operatively engaging and connected to the sleeve retaining tab members of the locking assembly and with excess sleeve material at the bottom corners of the forming member tucked into and retained within sleeve retaining gap portions of the locking assembly.

The final assembly step is to sequentially fold inwardly the sleeve portion 26c extending beyond the bottom edge 32 of the forming member sidewalls (FIGS. 6, 7 and 8). For the embodiment illustrated, as each of the sleeve portions 16c are sequentially folded inwardly over the bottom edge 32 of the sidewalls 22a, 22c, 22e, and 22g, they are pulled by their longitudinally spaced ends into taut engagement with the underling locking segments 24a, 24c, 24e, and 24g respectively in a manner such that the spaced slits 40 of the folded sleeve portion 26c cooperatively align with and slidably retainably engage the opposed sleeve engagement tab 35 respectively of the locking segments 24a, 24c, 24e or 24g with which they are aligned. The sleeve engagement tabs 35 thereafter retainably hold the sleeve 26 in locked engagement with the bottom of the container during subsequent handling and movement of the container, and thereafter during loading and transport. When the side portions of the lower sleeve portion 16c are tautly secured to the sleeve engagement tabs 35, excess sleeve material 16c naturally bunches up near the corners of the container adjacent the locking assembly formed gaps 27 (FIG. 6). Such excess sleeve material is readily folded and tucked into the gaps 27 and retainably held within the gaps in sandwiched positioned between the locking member segments forming the gaps. A bottom and side perspective view of the completed assembled bulk container is shown in FIG. 8.

Upon completion of the container assembly, the container can be inverted back to its upward position as shown in FIG. 1, for placement on a pallet and subsequent loading of bulk material. As bulk material is loaded into the container, the weight of the material applies increasing downward pressure to the bottom of the container and locking assembly, compressing the gaps 27 to even more tightly secure the sleeve material 16c in place to and under the container. The increasing retaining pressure applied to the secured sleeve under the container, counteracts the increased radial pressure applied to the sleeve that tries to pull the sleeve upward along the outer sidewalls of the forming member, providing extra strength and stability to the container.

When bulk material is loaded into the internal cavity of the forming member, the resultant downward and horizontal (radial) applied pressure from the bulk material against the forming member sidewalls is very large. Further, the outward radial pressure is largest near the lower third of the sidewalls. The outer sleeve is sized and configured to support the majority of the radial outward forces inserted by the bulk material to the forming member. However, to effectively do so, the outer sleeve must "snugly" engage the outer circumferential surface of the forming member so that it can immediately assume it's function of operatively containing the radial forces applied by the bulk material to the container walls. Since an end-glued forming member like that illustrated in FIGS. 2-4 is a rigid walled configuration surrounding the internal cavity 23 having little elasticity, and since a design benefit of the described type of forming member is that a fairly light-weight and less expensive forming member material can be utilized, if the outer sleeve does not substantially snugly engage substantially all of the outer surface areas of the forming member, the forming member material may be forced to expand beyond its rupture limit. Such rupture can decrease the effectiveness of the primary purposes for which the forming member is designed—to provide the structural shape and the majority of the rigidity and stackability and transport stability to the bulk container system. While the sleeve material is of sufficient strength to accept and counteract all of the radial forces applied through the forming member whether or not the forming member ruptures, it is desirable to not allow the forming member to rupture so as to preserve the viability of its intended functions described above.

Over the time that such bulk material container systems have been in the marketplace, certain design parameters have been developed for the container systems that provide safe and successful performance assurance. One such parameter consideration related to bulk material containment systems that have forming members with fixedly glued connecting ends (as in FIGS. 2-4), is that the tolerance difference between the outer circumference dimension of the forming member and the inner circumferential surface of the tubular sleeve that operatively engages the forming member, must not exceed (+/−) 0.25 inches. The relative 0.25 inch tolerance value at least applies to a forming member of the type described above which has a forming member outer circumference of 144 inches. It will be appreciated that the 0.25 inch acceptable tolerance value represents a very small percentage (about 0.17 percent) of the overall nominal circumferential length dimension of 144 inches. Even if the similar tolerance of 0.25 inches is used for smaller containers such as those having an outer forming member circumference of 80 inches, the 0.25 inch allowable tolerance value still only represents about 0.31 percent of the overall nominal circumferential length parameter.

The bulk container assembly process for containers of the type described has generally not been automated in the industry, but has been manually performed in a time consuming manner, particularly in view of the need for the outer sleeve member to snugly engage the outer walls of the forming member. As discussed in the Background Section above, in order to satisfy the acceptable snug fit tolerance of 0.25 inches, the container assembler was required to manually pre-sort both the forming members and the outer sleeves according to their individually measured actual outer and inner circumference dimensions respectively, and then match forming members and sleeves according to their presorted measurements. It has traditionally been found that for end-glued corrugated forming members, outer circumference tolerances can be controlled within a nominal dimension (+/−) 0.25 inch tolerance variation. However, it has been much more difficult to so accurately control the inner circumference dimensions of the sleeve within acceptable snug fit tolerances due to the nature of the woven polypropylene material from which the outer sleeves are formed. Even if an outer sleeve is woven to the same nominal dimension of the forming member plus a 0.25 inch plus tolerance, applying such sleeve over a forming member having a nominal dimension with a minus 0.25 tolerance would provide a mismatch between the forming member and sleeve circumferential dimensions of 0.5 inches, which is outside the permissible snug-fit requirement. The present invention addresses the costly labor functions of presorting and matching forming members and outer sleeves prior to assembly by providing a sleeve that is always manufactured to a single standardized nominal inner circumference dimension that matches the nominal outer circumference dimension of the forming member with which it will be used. As long as the glued forming member outer circumference dimensions are always within the nominal (+/−) 0.25 inch tolerance limits, no sorting will be required since the snug-fit tolerance between a nominally sized circumferential dimensioned sleeve will always satisfy the (+/−) 0.25 inch tolerance requirement.

For example, if the forming member outer circumference dimension measures at a nominal dimension minus 0.25 inches, the tolerance difference between a nominally dimensioned sleeve and the forming member is only minus 0.25 inches, which is within the snug-fit tolerance limit. In such case, the forming member would have to be able to stretch 0.25 inches across the entire forming member sidewall outer circumference before the overlying sleeve could fully accept the bulk material forces being exerted through the forming member. However, in such case, tests have shown that the forming member will generally not rupture under such small expansion over a larger outer circumferential dimension for the sidewall. On the other hand, if the forming member outer circumference is at the nominal dimension plus 0.25 inches, it will be within the plus 0.25 inch tolerance dimension when matched with a nominally dimensioned outer sleeve member, but will be 0.25 inches larger in circumference than the inner circumference of the outer sleeve. This situation, however, is also not a problem since when applying a sleeve to a forming member, the forming member is typically slightly mechanically bent or curved when initially inserting it within the sleeve and can be fully operatively inserted within the sleeve in a slightly but insignificantly bent configuration. Once assembled over the forming member, the sleeve will immediately fully accept any bulk material generated radial forces transmitted to it through the forming member.

Figure 9A:
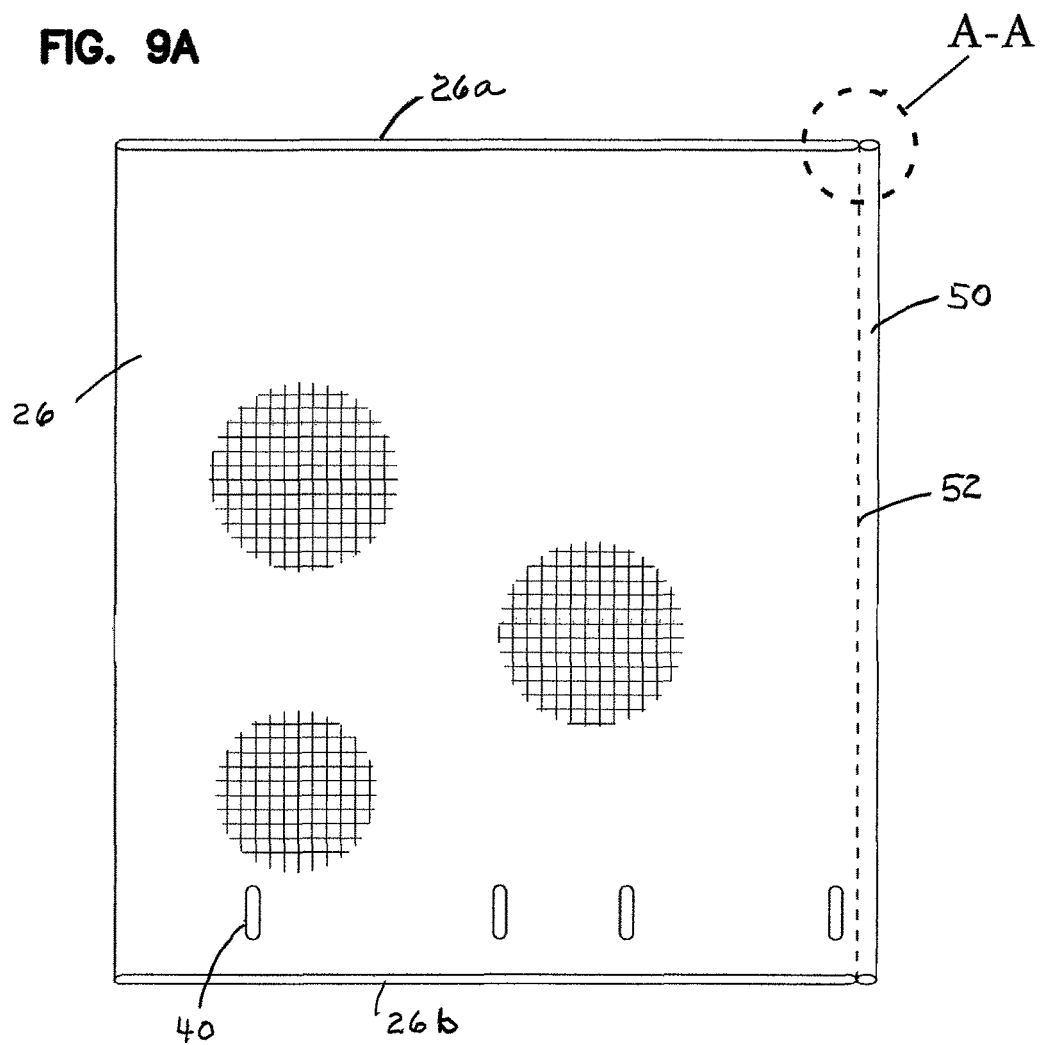
FIG. 9A is a diagrammatic pictorial view of one embodiment of an outer sleeve member for a bulk material container, configured according to this invention, having an adjustment tail portion with an included stitched bonding strip longitudinally extending along one side of the sleeve member.
Figure 9B:
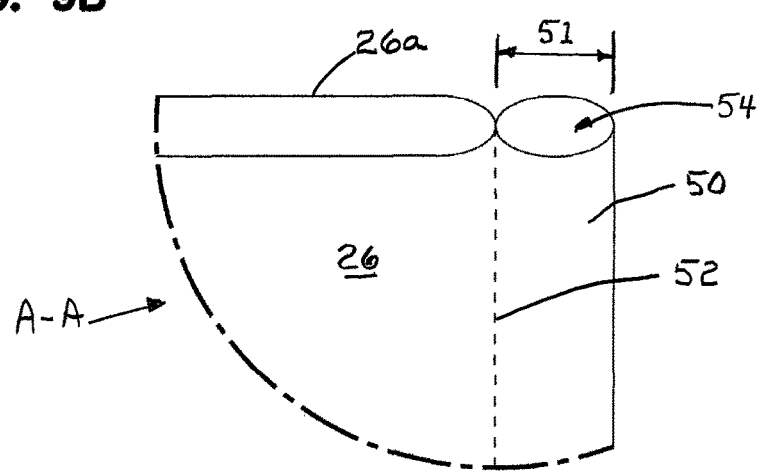
FIG. 9B is an enlarged fragmentary view of a corner end portion of the outer sleeve member of FIG. 9A that is enclosed within the dashed Circle A-A of FIG. 9A.
Figure 10A:
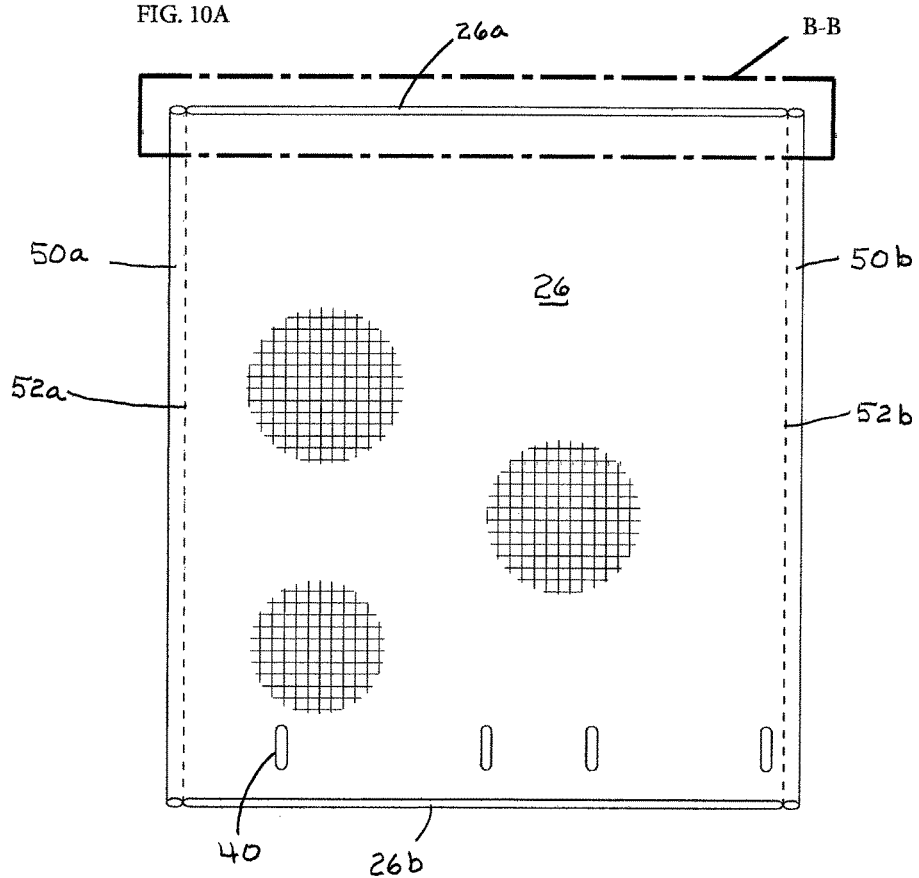
FIG. 10A is a diagrammatic pictorial view of a second embodiment of an outer sleeve member for a bulk material container, configured according to this invention, having a pair of spaced adjustment tail portions each including a stitched bonding strip longitudinally extending along opposite sides of the sleeve member.

To achieve the goal of eliminating pre-sorting and matching of sleeves and forming members during assembly of the container, one solution is to provide a method of manufacturing an outer sleeve that always has an internal circumference exactly or very close to the nominal dimension of the forming member. One technique for providing such an accurately dimensioned outer sleeve can be accomplished by initially weaving the sleeve with an inside circumference dimension that is equal to the determined standard nominal dimension of the forming member, plus an additional "circumferential adjustment length" preferably in the range of about 1.5 inches. When the sleeve is longitudinally extended and laid in a flat configuration with engaged opposed sides, as it would appear just before it is initially slid into overlying engagement with the forming member, the additional "folded over adjustment length" measurement length would be about 0.75 inches. Such additional folded over adjustment length material longitudinally disposed along one side of the sleeve, as shown in FIGS. 9A and 9B, is referred to herein as a "tail" or "adjustment tail" 50 of the sleeve material that is used to adjust the oversized inner circumference dimension of the sleeve down to the desired standard nominal dimension. It should be noted that the "adjustment length" measurements are taken in the lateral, or closed side to closed side direction across the sleeve as opposed to the longitudinal direction measurement between the opposed open ends of the sleeve. It is also noted that the term "nominal" as used with respect to the discussion of dimensions, is that circumferential dimension of the outer surface of the fixedly glued end-to-end forming member, or of the inner circumferential surface of the overlying sleeve, with no tolerance adjustments. While the length of sleeve material forming the adjustment tail 50 can vary, it is desirable to have a circumferential adjustment length that is sufficiently short so that the folded over tail material (generally indicated at 51 in FIG. 9B) is sufficiently small so as not to interfere with manufacturing or printing operations related to producing the sleeve, or to its aesthetic appearance, but is large enough to provide for accurate stitching of the tail and for subsequent manual or automated grasping of the sleeve (as hereinafter described) during assembly of the sleeve 26 to the forming member/locking assembly. It will also be appreciated that the sleeve illustrations of FIGS. 9 and 10 are only diagrammatic and are not to scale. For example, for the sleeve and tail dimensions for the above described container embodiment, the tail dimension would be nearly 100 times smaller than the width of the folded-over sleeve as shown in FIGS. 9 and 10.

The process of circular weaving of a tubular open-ended sleeve using polypropylene materials is well known in the art and is practiced by such companies as Conitex, Sunoco. The outer woven sleeve surfaces can be coated or laminated during manufacture with a layer of polypropylene film that can be applied with heat rollers that impregnate or fuse the polypropylene film material into the woven fabric in manner known in the weaving art, to add strength and waterproofing to the woven sleeve material. Following the initial weaving of the continuous, seamless tubular sleeve, the elongate tubular sleeve material is advanced along an assembly line manufacturing process with aid of a series of rollers where various operations such as the polypropylene coating operation can be performed on the sleeve material as it passes through the various functional assembly stages. For example, printing and/or graphics can be applied to the woven sleeve material as it proceeds down the assembly line following the weaving and optional coating processes. Such printing is typically performed by print rollers that engage and roll along both the upper and lower surfaces of the tubular sleeve material. Those skilled in the art will recognize the practices and methods and technology employed in sleeve manufacturing that enables accurate positioning and alignment of printing and graphics on the sleeve outer surfaces that will dimensionally align and mate with the forming member sidewalls that the sleeve will operatively engage. Those skilled in the art will also recognize the practices, methods and technology employed to position, align and form slits or other occlusion formations formed through the sleeve material at accurately positioned locations along the sleeve material as, for example, the slits along the bottom edge of the sleeve illustrated in FIG. 5 that are configured to cooperatively intersect and engage portions of the locking member assembly with which they will be functionally connected during the container assembly process. Such slits or occlusions can be, for example, performed by a mechanical knife blade or by hot blade or wire techniques that cut through the woven material in a manner that prevents the woven material from unraveling adjacent the cut or slit. These and other known operations may be performed on the sleeve material prior to or after final sizing of the interior circumferential dimension of the sleeve.

The sleeve is accurately sized to a desired universal and standard nominal internal circumferential dimension by accurately aligning the "tail" portion of the moving tubular sleeve material with a stitching or bonding mechanism that reduces the originally oversized inner circumference of the tubular sleeve down to the desired nominal dimension preferably along its entire length. The preferred method of bonding the two overlying layers of sleeve material in the "adjustment tail" strip of material is by a stitching process with heavy duty stitching techniques and thread, of a type commonly used, for example, in the stitching of handles or seams of FIBC's, as well as is well known in the art. The stitching head performing the stitching function can be accurately positioned overlying the strip of adjustment tail material and synchronized with movement of the sleeve as it proceeds along the manufacturing assembly line, so that the line doesn't have to stop to perform the stitching function. Using a typical stitch width of 0.25 inches within a folded over sleeve tail adjustment length of 0.75 inches, the stitching will leave a remaining loop of unstitched tail material of approximately 0.5 inches along the longitudinal outside portion of the sleeve, as generally shown in FIG. 9. Such small extra loop of tail material does not adversely interfere with either the operation or aesthetic features of the sleeve. If multiple lateral stitches are used to form the stitch line bond of the two layers of sleeve material, the radially innermost positioned stitch line determines the nominal inner circumference dimension of the sleeve. This dimension can be very accurately controlled by the relative positioning of the moving sleeve and the stitching head as the stitching is performed on the advancing flattened sleeve material. It has been found that the presence of stitching along one longitudinal edge of the sleeve does not compromise or weaken the structural strength of the sleeve or its ability to function in its intended manner in a bulk container system of the type herein described. Further, unlike stitching operations used for making FIBC's (bulk bags), since the stitching is being done on a continuously woven sleeve material, even if the stitching were to fail, the strength of the continuous sleeve material would not be diminished, enabling the sleeve to continue to operate in its intended manner to contain the bulk material within the container.

The universal nominally sized sleeve material can be shipped in continuous rolled configuration as manufactured, to the entity that applies the sleeve to the forming member/locking assembly. The receiving entity would then need to separate successive individual sleeves as they are applied to a forming member by cutting them to a proper length either before or directly after sliding the sleeve in operative position over the forming member/locking assembly.

Alternatively, oversized sleeve material that has not yet been sized to the nominal inner circumference dimension can be shipped in roll or individually cut and bundled form to a location remote from the point of weaving of the sleeve, where the final sleeve sizing operation will be performed. Such remote location might typically be at the point of manufacture of the forming member/locking assembly or where the sleeve is operatively applied in overlying manner to the forming member/locking assembly. At such facility, the sleeve could be individually bonded/stitched or continuously bonded/stitched as unwound from a sleeve roll to provide a desired nominal inner circumference dimension by forming an adjustment tail 50 as described above. If performed at a location where the sleeve is operatively applied to the forming member/locking assembly, the bonding/stitching operation could even be automated to match the outer circumferential dimension of each glued forming member by, for example, first measuring the actual outer circumference of each forming member on the assembly line, by adjusting the position of the bonding equipment relative to the adjustment tail portion of the sleeve to provide an inner sleeve circumference that matches the measured circumference and by then forming a bonded adjustment tail 50 such that the inner circumference of the sized sleeve matches the actual outer circumference of the glued forming member to which it will be applied. Those skilled in the art will recognize yet other manufacturing and container assembly scenarios applicable to practicing the present invention.

Figure 10B:
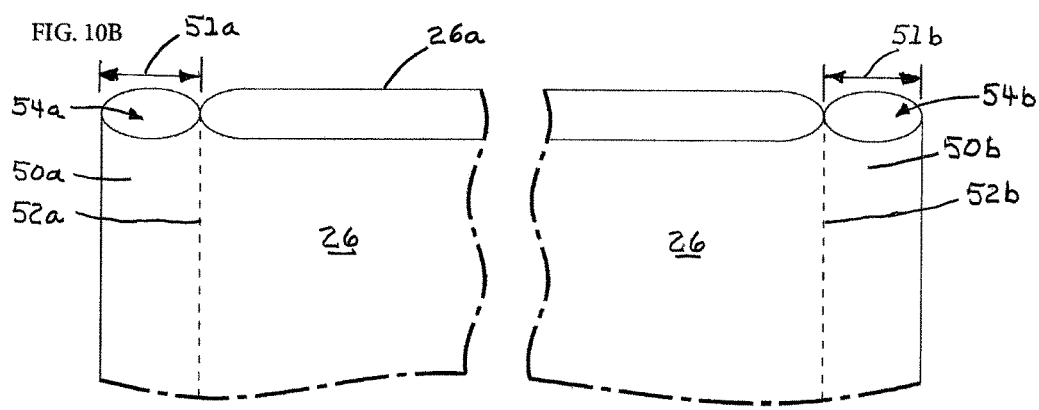
FIG. 10B is an enlarged fragmentary view of the upper end portion of the outer sleeve member of FIG. 10A that is enclosed within the dashed Lines B-B of FIG. 10A.

The sleeve could also be sized to the desired universal nominal dimension by initially oversizing the inner circumference of the woven sleeve to provide a plurality of adjustment tail lengths, such as, for example, an adjustment tail length on oppositely spaced sides of the sleeve as it proceeds down the assembly line. Using this technique, the stitching or other forms of bonding as discussed above and below would be performed on both of the spaced adjustment tail length sections to produce a sleeve with two oppositely disposed tails, as diagrammatically pictorially shown in FIGS. 10A and 10B. FIG. 10B illustrates an enlarged fragmentary view of the upper end portion of the outer sleeve configuration of FIG. 10A. In this case, the stitching or bonding equipment would be accurately positioned relative to each other across the sleeve such that the nominal inner circumferential dimension of the sleeve is established by that bonded sleeve material that is positioned between the innermost stitches or innermost spaced stitched bonds 52a, 52b formed by the spaced stitching or bonding equipment. This technique would yield a completed sleeve configuration having two separate tail loops 50a, 50b of material longitudinally extending along opposed sides of the sleeve 26. Preferably, the circumferential adjustment sleeve length measurements and thus the folded over adjustment sleeve length measurements 51a, 51b of the tail loops 50a, 50b would be about the same, but would not necessarily have to be the same, as long as the desired final inner circumferential dimension of the sleeve is accurately attained.

Besides accurately defining a desired inner circumference sleeve dimension the external adjustment tail material can be used to facilitate manual or automated process for operatively assembling the sleeve 26 to the forming member 22/locking assembly 24. Previously, the sleeve to forming member assembly process has generally been manually performed, typically by two assembly workers, one on each side of the folded-in-half forming member. The assemblers would grasp and slightly "open" one end of the sleeve from laterally opposed positions, would slide the opened sleeve end over one end of the folded-in-half forming member, and then pull the sleeve longitudinally along the length of the forming member to its desired position, as previously discussed. To facilitate the sliding assembly process, the forming member is typically slightly bent in arcuate manner between its lateral sides during the process to minimize catching of the sleeve on the leading edge of the forming member. Further, as shown in FIGS. 3 and 4 the outer upper leading corners of the forming member 22 are slightly curved at 34b, to minimize catching of the corners on the sleeve during the sliding operation. The externally projecting sleeve tail 50 portions provide a mechanism for facilitating and decreasing the assembly time of applying the sleeve 26 to the forming member 22. This is particularly true for the double tail 50 embodiment of the sleeve shown in FIG. 10. The opposed external tail portions 50a, 50b provide ready handles for assemblers to grasp while inserting and pulling the sleeve 26 over the forming member 22. In an automated assembly process the sleeve tail portions 50a, 50b can readily be grabbed and moved by, for example, a 2-finger gripper of the type attachable to a robotic arm of a universal robot. Such automated robotic equipment is well known by those skilled in the art and is available, for example, from the Gross Company, Robotiq and others. Complete electromechanical, pneumatic and robotic motion control solutions are available in the industry and readily customizable for automating the sleeve sizing and assembly process to minimize or eliminate costly manual labor functions.

Although stitching is the preferred technique for bonding the overlying sleeve layers in the adjustment tail region 50, other bonding techniques could be used, such as fusing a seam with a hot wheel/bar method, or by ultrasonic welding techniques, both well-known in the art. In ultrasonic welding of thermoplastic materials such as that of the woven polypropylene sleeve material, the weld technology uses mechanical vibrations to generate heat due to molecular friction. As the molecules are energized, the plastic material becomes soft and starts melting and forms a bond between the two engaged sleeve layers which are bonded together by cohesion for form-fit joints. After a short hold time under pressure, the layers are molecularly firmly joined. Because of its high process speed, ultrasonic joining/welding technology is readily adaptable to bonding of the sleeve tail material as the sleeve moves along on the manufacturing assembly line. Herrmann Ultrasonics, Inc. is a well-known leading company in the field of ultrasonic welding and has a wide array of equipment and machines and product lines that provide numerous variances that can be tailored by those skilled in the art to specific specifications for bonding the sleeve adjustment tail material as discussed above. Whether the sleeve material is formed to its uniform desired uniform nominal inner circumferential dimension by stitching, by a hot wheel-bar method, or by ultrasonic welding, the sleeve produced has an accurate known nominal dimension that can be directly applied to the glued forming member having a nominal (+/−) 0.25 inches without requiring any presorting and matching of forming members and sleeves in the bulk material container assembly process.

This specification provides several examples of embodiments of bulk material container configurations and assembly methods incorporating the principles of this invention. Other embodiments of the invention can be made without departing from the spirit and scope of the invention, which resides in the claims hereinafter appended.

What is claimed is:

1. An outer support sleeve of a type operable to snugly engage an outer surface of a forming member of a bulk material container, comprising:
   a. a continuously woven seamless tubular sleeve having a sleeve length, longitudinally extending between opposed open sleeve ends, and a sleeve initial inner circumference dimension;
   b. a first longitudinally extending circumference adjustment tail formed by said continuous sleeve material, extending along said sleeve length; and
   c. said adjustment tail being formed by a bonding strip extending along one longitudinal edge of said sleeve when in a flattened configuration, with opposed inner surfaces of said sleeve engaging one another in face to face relationship; said bonding strip fixedly bonding said opposed engaged inner surfaces of said sleeve to one another to accurately define an adjusted inner circumference dimension of said sleeve that is less than said initial sleeve inner circumference dimension.

2. The outer support sleeve of claim 1, wherein the sleeve material is woven polypropylene material.

3. The outer support sleeve of claim 2, wherein the woven sleeve material is impregnated with a coating of polypropylene material.

4. The outer support sleeve of claim 1, wherein the bonding strip comprises stitching.

5. The outer support sleeve of claim 1, wherein the bonding strip comprises an ultrasonically formed weld bond.

6. The outer support sleeve of claim 1, wherein the bonding strip comprises a hot melt formed bond.

7. The outer support sleeve of claim 1, further comprising:
   a. a second longitudinally extending circumference adjustment tail of said sleeve material, formed by the same bonding strip technique as that of said first circumference adjustment tail; said second circumference adjustment tail being diametrically oppositely disposed across said flattened sleeve from said first circumference adjustment tail; and
   b. said bonding strips of said first and said second circumference adjustment tails in combination, accurately defining said adjusted inner circumference dimension of said sleeve.

8. The outer support sleeve of claim 7, wherein said first and said second circumference adjustment tails each has a laterally measured width measured from an inner edge of said bonding strip to an outer longitudinal edge of said sleeve when in said flattened configuration, of at least about 0.5 inches.

9. The outer support sleeve of claim 7, wherein said first and said second circumference adjustment tails each has a laterally measured width measured from an inner edge of said bonding strip to an outer longitudinal edge of said sleeve when in said flattened configuration, in a range of between about 0.25 inches to about 0.75 inches.

10. A container for bulk materials, comprising:
    a. a forming member comprising a plurality of foldably interconnected sidewalls extending between upper and lower edges and operative when folded to cooperatively form and encircle an internal cavity for receiving bulk materials;
    b. a locking assembly cooperatively engaging said sidewalls to operatively define and fix the sidewalls in predetermined relative positions, said locking assembly forming at least in part, a bottom surface of said cavity;
    c. an outer tubular support sleeve made of continuous woven seamless material, having a sleeve length longitudinally extending between opposed open sleeve ends, and having a sleeve initial inner circumference dimension, further comprising:
       (i) a first longitudinally extending circumference adjustment tail formed by said continuous woven seamless sleeve material extending along said length of said sleeve; and
       (ii) said adjustment tail being formed by a bonding strip extending along one longitudinal edge of said sleeve when in a flattened configuration, with opposed inner surfaces of said sleeve engaging one another in face to face relationship; said bonding strip fixedly bonding said opposed engaged inner surfaces of said sleeve to one another to accurately reduce said sleeve initial inner circumference dimension to an adjusted inner circumference dimension; and
    d. said sleeve having said adjusted inner circumference dimension being sized, arranged and configured to operatively overlie and snugly engage substantially the entire outer surfaces of said forming member sidewalls.

11. The container of claim 10, wherein the sleeve material is woven polypropylene material.

12. The container of claim 11, wherein said woven sleeve material is impregnated with a coating of polypropylene material.

13. The container of claim 10, wherein said bonding strip of said sleeve comprises stitching.

14. The container of claim 10, wherein said bonding strip of said sleeve comprises an ultrasonically formed weld bond.

15. The container of claim 10, wherein said bonding strip comprises a hot melt formed bond.

16. The container of claim 10, wherein said sleeve further comprises a second longitudinally extending circumference adjustment tail of said continuous sleeve material, formed by the same bonding strip technique as that of said first circumference adjustment tail; said second circumference adjustment tail being diametrically oppositely disposed across said sleeve from said first circumference adjustment tail; wherein said bonding strips of said first and said second circumference adjustment tails in combination, accurately define said adjusted inner circumference dimension of said sleeve.

17. The container of claim 10, further defined by:
    a. said forming member comprising corrugated material having sidewalls that are fixedly end-bonded together to form a peripheral wall continuously encircling said internal cavity, wherein said sidewalls have a nominal outer peripheral circumference dimension; and
    b. wherein said adjusted inner circumference dimension of said sleeve is substantially the same as said nominal outer peripheral circumference dimension of said forming member sidewalls.

18. The container of claim 10, wherein said forming member comprises corrugated material having sidewalls that are fixedly end-bonded together to form a peripheral container wall, said forming member being foldable-in-half prior to operative assembly in 3-dimensional container form; and wherein said sleeve is operatively engaged to overlie said forming member when said forming member is in said folded-in-half configuration.

19. A method of manufacturing an outer support sleeve for a bulk material container of the type having a forming member comprising a plurality of foldably interconnected sidewalls extending between upper and lower edges and operative when folded and held in place by a locking assembly, to cooperatively form and encircle an internal cavity for receiving bulk materials; wherein said outer support sleeve is configured to snugly operatively overlie substantially the entire outer surface area of said forming member sidewalls to counteract radial forces exerted by bulk materials within the container on the sidewalls, comprising the steps of:
    a. weaving a continuous seamless open ended tubular sleeve of material having a first inner sleeve circumference dimension;
    b. flattening said tubular sleeve along its longitudinal length extending between opposed open sleeve ends, such that juxtaposed upper and lower inner portions of said flattened sleeve engage each other in face to face relationship along said longitudinal length of said flattened sleeve;

c. fixedly bonding together said upper and lower face to face engaged portions of said flattened sleeve material to form a first bonding strip along a first longitudinal edge of said flattened sleeve material, and a first adjustment tail of the continuous sleeve material laterally extending outwardly from said first bonding strip along said first longitudinal sleeve edge; wherein an inner edge of said first bonding strip reduces said first inner sleeve circumference dimension and defines an accurately sized adjustment sleeve inner circumference dimension of the sleeve material.

20. The method of claim 19, wherein said bonding step comprises stitching said upper and lower engaged portions of said flattened sleeve material along said first longitudinal edge of said flattened sleeve material.

21. The method of claim 19, wherein said bonding step comprises ultrasonically welding said upper and lower engaged portions of said flattened sleeve material along said first longitudinal edge of said flattened sleeve material.

22. The method of claim 19, including a step of fixedly bonding together said upper and lower face to face engaged portions of said flattened sleeve material, to form a second bonding strip along a second longitudinal edge of said flattened sleeve material that is diametrically opposed from and parallel to said first longitudinal edge, and a second adjustment tail of the continuous sleeve material laterally extending outwardly from said second bonding strip along said second longitudinal sleeve edge; wherein inner edges of said first and said second bonding strips along said first and said second longitudinal edges of said flattened sleeve, in combination with the inner surface of said sleeve material, define said accurately sized adjusted sleeve inner circumference dimension of said sleeve.

23. The method claim 19, wherein said tubular sleeve is woven from polypropylene material.

* * * * *